(12) United States Patent
Watanabe

(10) Patent No.: US 8,472,796 B2
(45) Date of Patent: Jun. 25, 2013

(54) PHOTOGRAPHING DEVICE EQUIPPED WITH GEOMAGNETIC SENSOR

(75) Inventor: Kohei Watanabe, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/237,534

(22) Filed: Sep. 20, 2011

(65) Prior Publication Data
US 2012/0070137 A1 Mar. 22, 2012

(30) Foreign Application Priority Data

Sep. 21, 2010 (JP) ................................. 2010-210323

(51) Int. Cl.
G03B 17/00 (2006.01)
(52) U.S. Cl.
USPC .......................................................... 396/50
(58) Field of Classification Search
USPC .......................................................... 396/50
See application file for complete search history.

(56) References Cited

U.S. PATENT DOCUMENTS

| 7,385,643 | B2 * | 6/2008 | Muramatsu | 348/373 |
| 2005/0190281 | A1 * | 9/2005 | Lee et al. | 348/333.12 |
| 2010/0299093 | A1 * | 11/2010 | Okeya | 702/92 |
| 2011/0313690 | A1 * | 12/2011 | Sato | 702/57 |
| 2012/0268621 | A1 * | 10/2012 | Kanma et al. | 348/222.1 |

FOREIGN PATENT DOCUMENTS

| JP | 2005291936 | * 10/2005 |
| JP | 2009-278674 A | 11/2009 |
| JP | 2011-139375 A | 7/2011 |
| WO | WO2011080946 | * 7/2011 |

OTHER PUBLICATIONS

Japanese Office Action dated Nov. 6, 2012 (and English translation thereof) in counterpart Japanese Application No. 2010-210323.

* cited by examiner

Primary Examiner — Rodney Fuller
(74) Attorney, Agent, or Firm — Holtz, Holtz, Goodman & Chick, P.C.

(57) ABSTRACT

A photographing device includes a geomagnetic sensor which detects an intensity of geomagnetism, an image capture unit which captures an image, and a lens tube including a part that exerts magnetic influence on the geomagnetic sensor, wherein a position of the part is shiftable. In addition, the photographing device includes a detection unit which detects a current shifted position of the part in the lens tube, an obtaining unit which obtains a magnetic field that exerts magnetic influence on the geomagnetic sensor from the lens tube corresponding to the current shifted position detected by the detection unit, and an orientation calculation unit which calculates an orientation by correcting an output of the geomagnetic sensor based on the magnetic field obtained by the obtaining unit.

7 Claims, 5 Drawing Sheets

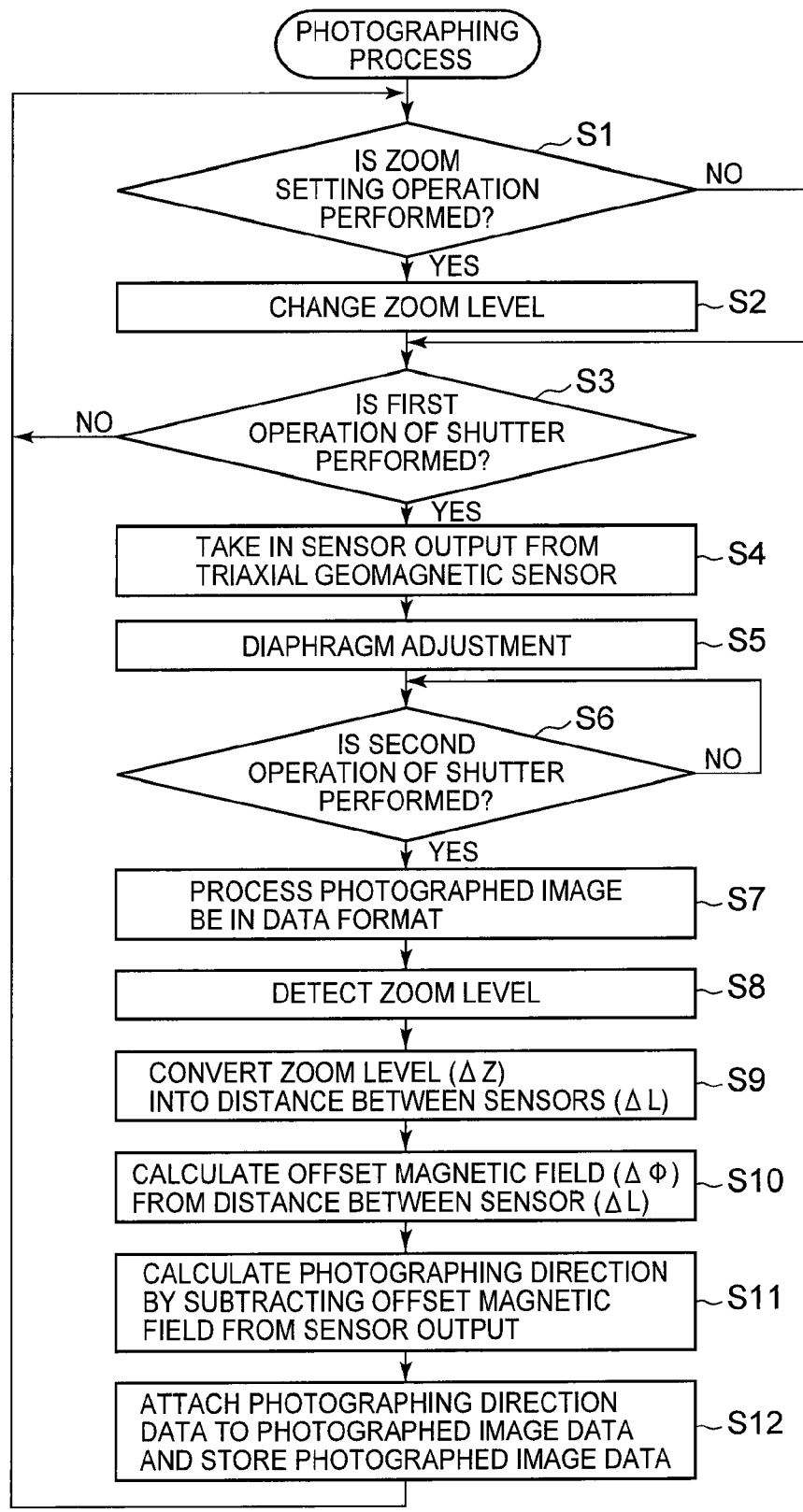

PHOTOGRAPHING DEVICE EQUIPPED WITH GEOMAGNETIC SENSOR

BACKGROUND OF THE INVENTION

1. Field of the Invention

The present invention relates to a photographing device equipped with a geomagnetic sensor.

2. Description of the Related Art

In recent years, it is attempted to add a function of measuring orientation to portable electronic devices by equipping the portable electronic devices with a geomagnetic sensor.

Normally, various types of components which generate magnetic field by being energized are installed in electronic devices.

There are cases where accurate orientation cannot be measured because accurate output cannot be obtained from the geomagnetic sensor due to the influence of such parts.

As a technique to eliminate such influence of the above parts, a technique shown in JP 2009-278674 is known.

In JP 2009-278674, there is disclosed a technique in which a plurality of operation condition of various types of circuits that exert magnetic influence and offset values of magnetic fields that acts on the magnetic sensor are registered in a data table in advance, and the geomagnetic orientation is corrected and obtained by using the offset values in the data table when measuring the orientation.

SUMMARY OF THE INVENTION

An object of the present invention is to make a photographing device which is equipped with a geomagnetic sensor be able to measure its orientation accurately by removing magnetic influences even when the photographing device includes components that exert magnetic influence on the geomagnetic sensor and their magnetic influence levels to the geomagnetic sensor change by the components being displaced.

In order to solve at least one of the above problems, one aspect of a photographing device of the present invention includes a geomagnetic sensor which detects an intensity of geomagnetism, an image capture unit which captures an image, a lens tube including a part that exerts magnetic influence on the geomagnetic sensor, in which a position of the part shifts, a detection unit which detects a current shifted position of the part in the lens tube, an obtaining unit which obtains a magnetic field that exerts magnetic influence on the geomagnetic sensor from the lens tube corresponding to the current shifted position detected by the detection unit, and an orientation calculation unit which calculates an orientation by correcting an output of the geomagnetic sensor based on the magnetic field obtained by the obtaining unit.

BRIEF DESCRIPTION OF THE DRAWING

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a flowchart showing a photographing process control procedure executed by a CPU.

DESCRIPTION OF THE PREFERRED EMBODIMENTS

Hereinafter, an embodiment of the present invention will be described based on the drawings.

Figure 1:
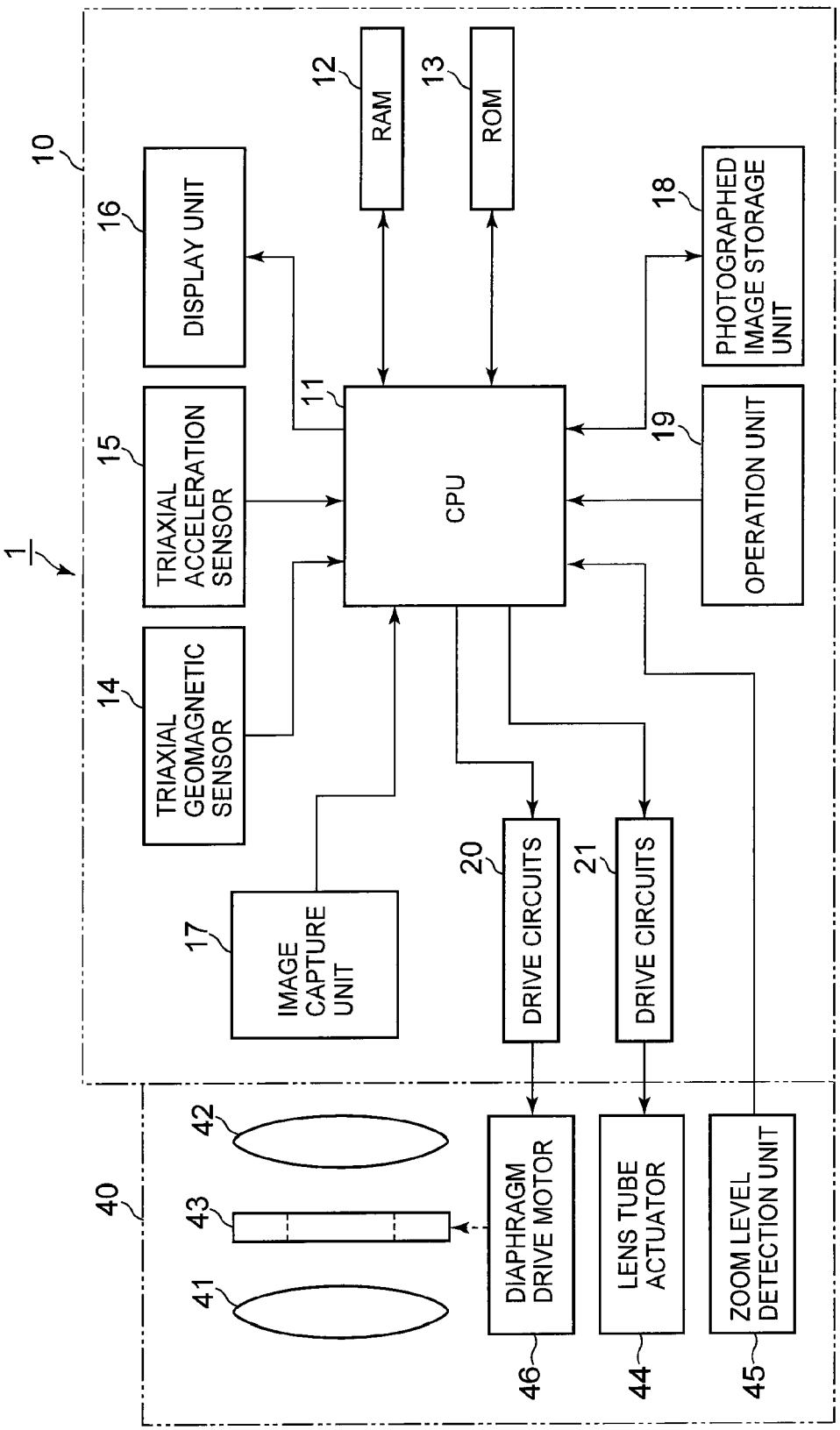
FIG. 1 is a block diagram showing a structure of a photographing device according to an embodiment of the present invention.

FIG. 1 is a block diagram showing a structure of a photographing device according to the embodiment of the present invention.

The photographing device 1 according to the embodiment is a digital camera which electrically takes in captured images and stores as image data.

The photographing device 1 includes a lens tube 40.

The lens tube 40 includes lenses 41 and 42 which change the zoom magnification by shifting their positions in the optical axis direction, a diaphragm 43 which limits the light beam that enters from the lens 41, a diaphragm drive motor 46 which changes the opening level of the diaphragms 43 by electrically driving the diaphragm 43, a lens tube actuator 44 which changes the positions of lenses 41 and 42 by extending/shortening the lens tube 40, a zoom level detection unit 45 to detect and feedback the moving degree of the lens tube actuator 44, and the like.

Moreover, the main body 10 of the photographing device 1 to where the lens tube 40 is attached includes a CPU (Central Processing Unit) 11 which integrally controls the photographing device 1, a RAM (Random Access Memory) 12 which operates as a working memory of the CPU 11, a ROM (Read Only Memory) 13 in which control programs which are executed by the CPU 11 and control data are stored, a triaxial geomagnetic sensor (geomagnetic sensor) 14 which detects the intensity of geomagnetic, a triaxial acceleration sensor 15 which detects the intensity of acceleration, a display unit 16 which displays a live-view image and photographed images, an image capture unit 17 which converts an optical image into an electric signal, the image capture unit 17 being constituted of a CCD (Charged Coupled Device) and the like, for example, a photographed image storage unit 18 which stores image data of photographed images, the photographed image storage unit 18 being constituted of a nonvolatile memory such as a flash memory, for example, an operation unit 19 which receives operation inputs such as a zoom operation, a shutter operation and the like performed by a user, the operation unit 19 having operation buttons and operation levers, drive circuits 20 and 21 of the diaphragm drive motor 46 and the lens tube actuator 44, respectively, and the like.

In the above structure, a control unit which attaches orientation data of photographing direction obtained from an output of the triaxial geomagnetic sensor to the generated image data and stores the image data is configured by the CPU 11.

The storage unit for storing displacement versus magnetic field data is structured in the ROM 13.

The lens tube 40 shifts the positions of the lenses 41 and 42 by extending/shortening the lens tube 40 by the lens tube actuator 44 being driven based on a command of the CPU 11.

According to the shifted positions of the lenses 41, zoom magnifications of captured images change.

Further, the CPU 11 controls the positions of the lenses 41 and 42 by detecting and feeding back the driving amount of the lens tube actuator 44 by the zoom level detection unit 45 (detection unit).

Thereby, the CPU 11 changes the zoom level of the lens tube 40 at a predetermined interval from first level to fifteenth level, for example, and can change the zoom magnification of captured images.

The lens tube 40 is provided with the diaphragm drive motor 46 which shifts its position by the extending/shortening of the lens tube 40.

A magnetic material which generates magnetic field such as a permanent magnet is used for the diaphragm drive motor 46.

When the position of the magnetic material shifts due to the extending/shortening of the lens tube 40, size and direction of the magnetic field which acts on the triaxial geomagnetic sensor 14 that is generated from the magnetic material also change.

Each of the diaphragm drive motor 46 and the lens tube actuator 44 are provided with an electromagnet coil.

Therefore, during the period when the diaphragm drive motor 46 and the lens tube actuator 44 are being energized to be driven, electric fields are generated from the electromagnetic coils.

From the generated electric fields of the electromagnetic coils, magnetic fields are generated and the magnetic fields exert magnetic influence on the triaxial geomagnetic sensor 14.

That is, in such way, the electric drive unit which generates magnetic fields by being electrically driven is structured.

Figure 2:
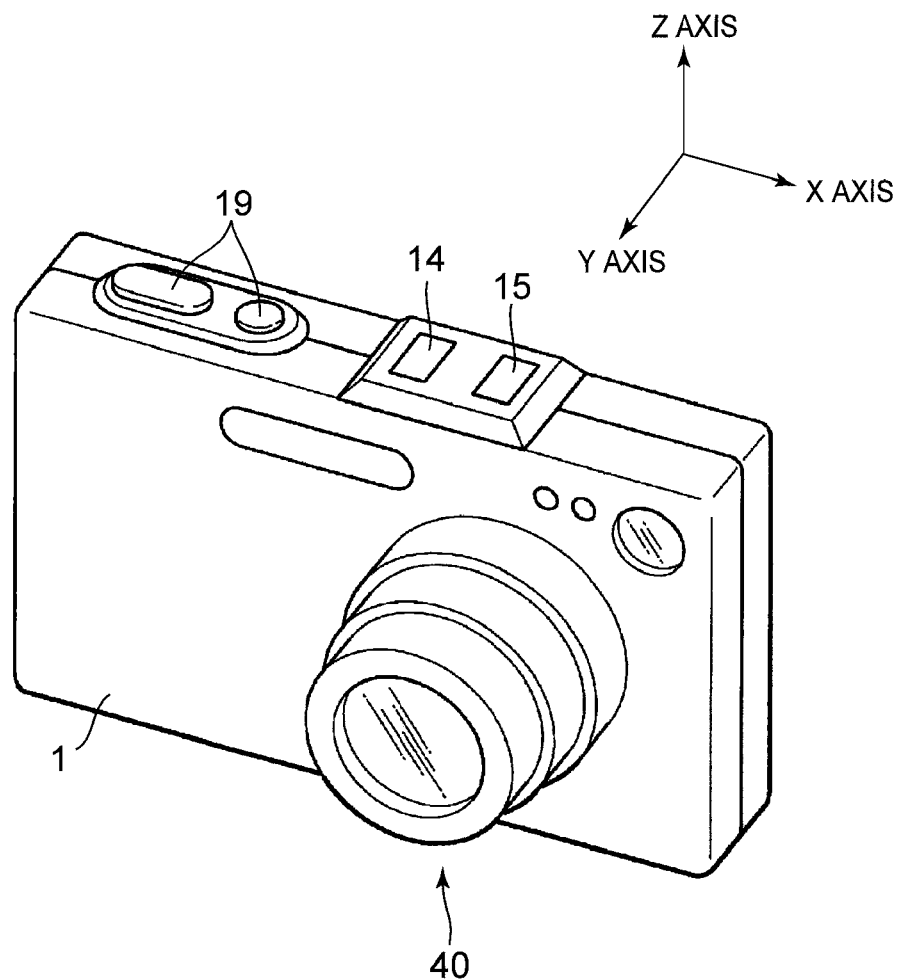
FIG. 2 is a diagram showing an outer appearance of the photographing device according to the embodiment of the present invention.

FIG. 2 is an outer appearance of the photographing device 1 in which the triaxial geomagnetic sensor 14 and the triaxial acceleration sensor 15 are disposed.

In each of the triaxial geomagnetic sensor 14 and the triaxial acceleration sensor 15, the horizontal direction of the main body of the photographing device 1 is x axis, the optical axis direction of the lens tube 40 is y axis, and the vertical direction of the main body of the photographing device 1 is z axis.

The triaxial geomagnetic sensor 14 detects the size of the magnetic field in three axis directions of x axis, y axis and z axis which are orthogonal to each other.

The triaxial acceleration sensor 15 detects the intensity of acceleration in three axis directions of x axis, y axis and z axis.

The output of the triaxial acceleration sensor 15 is used for detecting the direction of gravitational force.

Moreover, the angle of depression of the photographing direction (direction of the center line of the lenses 41 and 42) of the photographing device 1 is calculated based on the detected direction of gravitational force.

The CPU 11 can calculate the orientation of the photographing direction from the direction of geomagnetism obtained from the output of the triaxial geomagnetic sensor 14 and the angle of depression of the lens tube 40.

Figure 3:
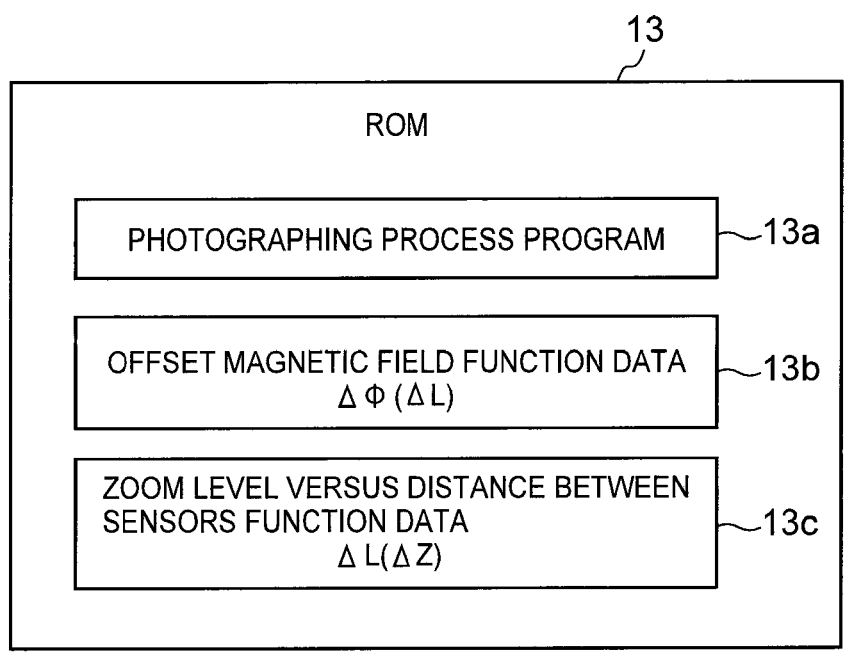
FIG. 3 is a diagram showing a control program and contents of control data stored in a ROM.

FIG. 3 shows a diagram showing a control program and the contents of control data which are stored in the ROM.

In the ROM 13, a photographing process program 13a for storing the image data by carrying out photographing according to a user's operation is stored as one of the control programs.

Further, in the ROM 13, zoom level versus distance between sensors function data 13c "$\Delta L (\Delta Z)$" which expresses the relation between the zoom level "$\Delta Z$" and the distance "$\Delta L$" to the triaxial geomagnetic sensor 14 from the part of the lens tube 40 that exerts magnetic influence in a functional form is stored as one of the control data.

Here, the part of the lens tube 40 that exerts magnetic influence is the part where the diaphragm drive motor 46 is disposed, for example.

Moreover, in a case where a focus motor (omitted from the drawing) is provided at the movable part of the lens tube 40, this part where the focus motor is disposed is also included as the part of the lens tube 40 that exerts magnetic influence.

The distance "$\Delta L$" is constituted of three components each of which expresses the distance in each of x axis, y axis and z axis.

The zoom level versus distance between sensors function data 13c "$\Delta L (\Delta Z)$" can be obtained by calculating by using the design values of the extending/shortening structure of the lens tube 40 and the design values that express the disposition of the diaphragm drive motor 46 and the disposition of the triaxial geomagnetic sensor 14 in the development stage of the photographing device 1.

Here, the zoom level versus distance between sensors function data 13c "$\Delta L (\Delta Z)$" may be provided as a table data that expresses the above relations.

Moreover, in the ROM 13, offset magnetic field function data 13b "$\Delta \Phi (\Delta L)$" as displacement degree versus magnetic field data in which the relation between distance "$\Delta L$" and offset magnetic field data "$\Delta \Phi$" is expressed in elementary function is stored as one of the control data.

The offset magnetic field data "$\Delta \Phi$" expresses the size and direction of a magnetic field which exerts influence on the triaxial geomagnetic sensor 14 from the lens tube 40, and is constituted of values of three components which express size of the magnetic field in the directions of x axis, y axis and z axis.

The offset magnetic field function data $\Delta \Phi (\Delta L)$ is decided based on actual measurement values in the development stage of the photographing device 1.

In particular, size of magnetic field in directions of three axes that exert influence on the traixial geomagnetic sensor 14 is measured while changing the distance "$\Delta L$" by actually extending/shortening the lens tube 40 in an environment where geomagnetic is sealed out or in an environment where the direction and size of the geomagnetic is known, for example.

The value obtained by subtracting the magnetic field of the geomagnetism from the actual measurement value is the offset magnetic field data "$\Delta \Phi$" that exerts influence on the triaxial geomagnetic sensor 14 from the lens tube 40.

Then, data which expresses the relation between the distance "$\Delta L$" and the actually measured offset magnetic field data "$\Delta \Phi$" is obtained.

Further, the elementary function (algebraic function, trigonometric function, exponent function, logarithm function and combinations thereof) which matches the above data is selected and coefficients of the function which most approximate the data are decided by using a method such as least-square method.

Then, the function is set as the offset magnetic field function data 13b "$\Delta \Phi (\Delta L)$".

Here, differently from obtaining the data which expresses the relation between the distance "$\Delta L$" and the offset magnetic field data "$\Delta \Phi$" from actual measurement values as described above, data which express the above relation can be obtained from a simulation or based on logic and the offset magnetic field function data 13b "$\Delta \Phi (\Delta L)$" may be obtained based on the obtained data.

Figure 4:
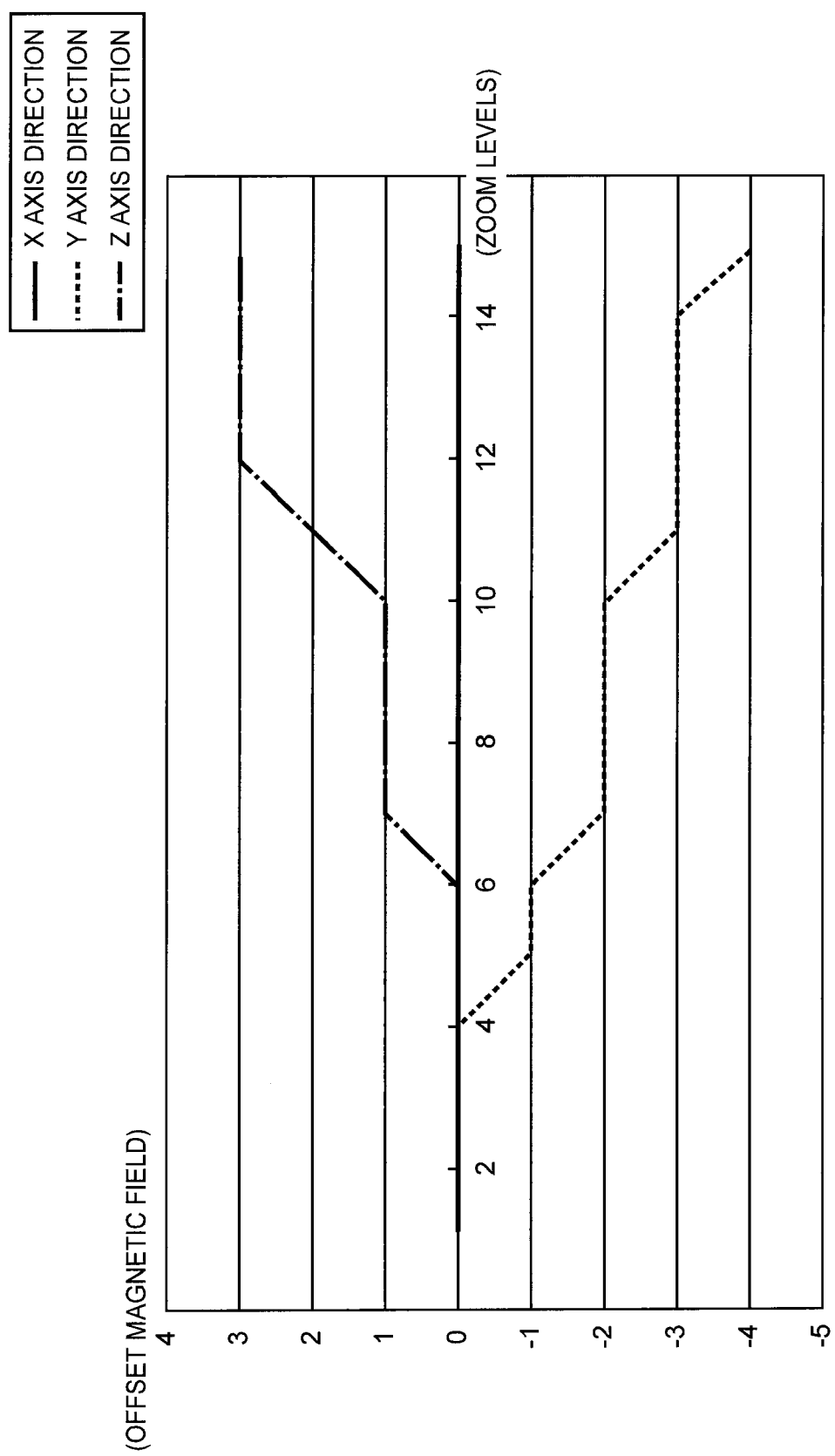
FIG. 4 is a graph conceptually showing a relation between the zoom levels and offset magnetic field that acts on the triaxial geomagnetic sensor.

FIG. 4 shows a graph which conceptually expresses a relation between the zoom level "ΔZ" and offset magnetic field data "ΔΦ" that exerts influence on the triaxial geomagnetic sensor.

In the graph, the offset magnetic field that exerts influence on the triaxial geomagnetic sensor 14 when the zoom level is at first level is set as the standard value "0", and the graph conceptually expresses the degree of changes from the standard value of the offset magnetic field according to varying of zoom level.

According to the offset magnetic field function data 13b and the zoom level versus distance between sensors function data 13c set as described above, the offset magnetic field data "ΔΦ" that exerts influence on the triaxial geomagnetic sensor 14 from the lens tube 40 is approximately obtained by applying the zoom level "ΔZ" as shown in the graph of FIG. 4.

As shown in FIG. 4, the offset magnetic field data "ΔΦ" varies in different patterns for each of the components of three axis directions as the zoom level be greater, according to the disposition relation between the triaxial geomagnetic sensor 14 and the lens tube 40.

Next, the operation of the photographing device 1 having the above structure will be described with reference to the flowchart.

FIG. 5 shows a flowchart of a photographing process which is to be executed by the CPU 11.

The photographing process starts when the photographing device 1 is set to the photographing mode by an operation of the operation unit 19.

When switching to the photographing process, the CPU 11 first confirms input signal from the operation unit 19 and determines whether the operation input of zoom setting is carried out or not (step S1).

Then, when the operation input of zoom setting is carried out, the CPU 11 extends/shortens the lens tube 40 for the number of levels corresponding to the operation by driving the lens tube actuator 44 while performing the feedback control by the detection signal from the zoom level detection unit 45 (step S2).

When there is no operation input of zoom setting or when there is an operation input to change the zoom level, the CPU 11 confirms input signal from the operation unit 19 and determines whether the first operation (for example, halfway pressing) of the shutter button is performed or not (step S3).

When the first operation of the shutter button is not performed, the CPU 11 returns the process to step S1.

By the loop processing of the above steps S1 to S3, a user can set the lens tube 40 to a desired zoom level by extending/shortening the lens tube 40 by performing the operation input of zoom setting before carrying out the first operation of the shutter button.

On the other hand, when the first operation of the shutter button is performed and when switched to the "YES" side in the determination process of step S3, the CPU 11 first takes in the detection output of the triaxial geomagnetic sensor 14 during the period when the lens tube actuator 44 and the diaphragm drive motor 46 are not being energized (step S4).

Here, the CPU 11 also takes in the detection output of the triaxial acceleration sensor 15 in a similar manner.

Next, the CPU 11 detects the incident light by a signal of the image pickup unit 17 and adjusts the amount of incident light by driving the diaphragm drive motor 46 (step S5).

Then, when the amount of incident light is adjusted, the CPU 11 waits until the second operation (for example, full pressing) of the shutter button is to be performed (step S6).

When the second operation of the shutter button is performed, the CPU 11 inputs the signal from the image pickup unit 17 and generates image data of the photographed image (step S7).

Next, the CPU 11 detects the zoom level by the detection signal of the zoom level detection unit 45 (step S8).

Here, when setting change of zoom level is carried out in step S2, the CPU 11 may store the data which expresses the zoom level in a predetermined region in the RAM 12 and detects the zoom level by reading out the data.

When the zoom level is detected, the CPU 11 converts the zoom level to the distance "ΔL" to the triaxial geomagnetic sensor 14 by assigning the value of zoom level "ΔZ" in the zoom level versus distance between sensors function data 13c in the ROM 13 (step S9).

Thereafter, the CPU 11 uses the offset magnetic field function data 13b in the ROM 13 to calculate the offset magnetic field data "ΔΦ" that exerts influence on the triaxial geomagnetic sensor 14 from the lens tube 40 by assigning the value of the distance "ΔL" into the function (step S10).

Then, the CPU 11 subtracts the above calculated offset magnetic field data "ΔΦ" from the sensor output of the triaxial geomagnetic sensor 14 which is taken in in step S4 and calculates the photographing direction in orientation by setting the subtracted magnetic field as geomagnetism (step S11).

The calculation of photographing direction is carried out as described above from the direction of geomagnetism and the direction of gravitational force obtained from the output of the triaxial acceleration sensor 15.

The orientation calculation unit is constituted by the above processes of steps S9 to S11.

Then, when the photographing direction is calculate, the CPU 11 attaches the photographing direction data as meta data, for example, to the image data which is generated in step S7 and stores this image data in the photographed image storage unit 18 (step S12).

Thereafter, the CPU 11 finishes the photographing process for one time and returns the process to step S1.

As described above, according to the photographing device 1 of the embodiment, by the zoom level versus distance between sensors function data 13c and the offset magnetic field function data 13b which are stored in the ROM 13, the offset magnetic field data "ΔΦ" that exerts influence on the triaxial geomagnetic sensor 14 from the lens tube 40 is obtained according to the displacement of the magnetic material such as a permanent magnet used for the diaphragm drive motor 46 where the position thereof changes due the extending/shortening of the lens tube 40.

Further, orientation is to be calculated by the offset magnetic field data "ΔΦ" being subtracted from the output of the triaxial geomagnetic sensor 14.

Therefore, an accurate orientation in which magnetic influence of the lens tube 40 is eliminated can be obtained in the photographing device 1.

Particularly, in the photographing device 1 of the embodiment, orientation is calculated by the offset magnetic field data "ΔΦ" which changes with the change in zoom level being subtracted.

Zoom level is to be set in various conditions at the time of photographing, therefore, the zoom level cannot be fixed to a predetermined zoom level for photographing.

Thus, when the orientation is to be measured at the time of photographing, it is necessary to consider the offset magnetic field from the lens tube 40 that changes according to the zoom level.

According to the photographing device 1 of the embodiment, orientation is calculated by the offset magnetic field data "ΔΦ" according to the zoom level being eliminated. Therefore, an accurate orientation can also be measured at the time of photographing.

Moreover, in the photographing device 1 of the embodiment, the calculated orientation data expresses the photographing direction and is attached to the image data of the photographed image.

Thus, in the photographing device 1 of the embodiment, by an accurate orientation being measured at the time of photographing as described above, there is an advantage that image data to which the orientation data expressing the accurate photographing direction is attached can be generated.

Further, in the photographing device 1 of the embodiment, the offset magnetic field data "ΔΦ" is calculated by function calculation by using the offset magnetic field function data 13*b* and the zoom level versus distance between sensors function data 13*c* which are in functional forms.

Therefore, comparing to the data amount in the configuration where the offset magnetic field data "ΔΦ" is obtained by using data in data table format, data amount for obtaining the offset magnetic field data "ΔΦ" can be made lesser even when the number of the zoom levels increases.

Moreover, in other models having similar disposition relation of the triaxial geomagnetic sensor 14 and the lens tube 40 and similar structure of lens tube 40, the zoom level versus distance between sensors function data 13*c* can be changed according to the levels of zoom magnification and displacement in each level having different designs.

Particularly, by only changing the zoom level versus distance between sensors function data 13*c* to that for the particular model, orientation data can be calculated by using the same offset magnetic field function data 13*b*.

Thereby, in the photographing device 1 of the embodiment, the development cost can be reduced.

Moreover, although it is not shown in the drawings, in a case where the lens tube actuator 44 and the diaphragm drive motor 46 are stepping motors or the like, a function data for calculating the offset magnetic field data "ΔΦ" including periodical change in magnetic field due to rotation stopping position of the motors may be set.

Further, in the photographing device 1 of the embodiment, the lens tube actuator 44 and the diaphragm drive motor 46 are provided as parts where generate magnetic field by being energized.

However, as for the offset magnetic field function data 13*b*, only the function data for calculating offset magnetic field data "ΔΦ" in a state where the parts are not being energized.

Further, when orientation is to be measured, the sensor output of the triaxial geomagnetic sensor 14 is taken in during the period where the above parts are not being energized.

Therefore, comparing to the data amount in the configuration where orientation can be calculated by obtaining the offset magnetic field which corresponds to each of the conditions including the condition where the parts which generate electric magnetic field are being energized, there is an advantage that data amount can be reduced in the configuration where the offset magnetic field is obtained.

Here, the present invention is not limited to the above described embodiment and can be changed in various ways.

For example, the lens tube 40 of the lenses 41 and 42 is exemplified as a lens tube having a part which exerts magnetic influence. However, the present invention can be similarly applied in a case where a diaphragm in which the movable blade is constituted of a magnetic material and an image stabilization mechanism are provided at the part where the position the lens tube varies.

Moreover, in the embodiment, data in functional form is used as an example of data for obtaining the offset magnetic field from the displacement of the part in which the position of the lens tube caries. However, data in data table format can be used.

Further, in the embodiment, the example in which the present invention applied to the function of obtaining the orientation of the photographing direction at the time of photographing is shown. However, the present invention can be similarly applied when obtaining the orientation in circumstances other than photographing such as in the function of electronic compasses.

The details shown in the embodiment can be arbitrarily changed within the scope of the present invention.

According to a first aspect of the preferred embodiments of the present invention, there is provided a photographing device including a geomagnetic sensor which detects an intensity of geomagnetism, an image capture unit which captures an image, a lens tube including a part that exerts magnetic influence on the geomagnetic sensor, in which a position of the part shifts, a detection unit which detects a current shifted position of the part in the lens tube, an obtaining unit which obtains a magnetic field that exerts magnetic influence on the geomagnetic sensor from the lens tube corresponding to the current shifted position detected by the detection unit, and an orientation calculation unit which calculates an orientation by correcting an output of the geomagnetic sensor based on the magnetic field obtained by the obtaining unit.

Preferably, the obtaining unit obtains the magnetic field based on a function expression which expresses a relation between a shifted position of the lens tube which is obtained in advance and the magnetic field that exerts magnetic influence on the geomagnetic sensor from the lens tube.

Preferably, the obtaining unit obtains the magnetic field by using a table data which expresses a relation between a shifted position of the lens tube which is obtained in advance and the magnetic field that exerts magnetic influence on the geomagnetic sensor from the lens tube.

Preferably, the lens tube is a zoom lens.

The photographing device further includes a control unit which generates image data of a photographed image by receiving an output of the image pickup unit and stores the image data by making an orientation data which is calculated by the orientation calculation unit associate with the image data, and the orientation calculation unit calculates an orientation of a photographing direction based on the output of the geomagnetic sensor which is obtained at a time of photographing.

The photographing device further includes an electronic drive unit which generates a magnetic field by being electrically driven, and the orientation calculation unit calculates the orientation based on the output of the geomagnetic sensor when the electronic drive unit is not being driven.

The present U.S. patent application claims a priority under the Paris Convention of Japanese paten application No. 2010-210323 filed on Sep. 21, 2010, which shall be a basis of correction of an incorrect translation.

Although various exemplary embodiments have been shown and described, the invention is not limited to the embodiments shown. Therefore, the scope of the invention is intended to be limited solely by the scope of the claims that follow.

What is claimed is:

1. A photographing device, comprising:
 a geomagnetic sensor which detects an intensity of geomagnetism;
 an image capture unit which captures an image;
 a lens tube including a part that exerts magnetic influence on the geomagnetic sensor, wherein a position of the part is shiftable;
 a detection unit which detects a current shifted position of the part in the lens tube;
 an obtaining unit which obtains a magnetic field that exerts magnetic influence on the geomagnetic sensor from the lens tube corresponding to the current shifted position detected by the detection unit; and
 an orientation calculation unit which calculates an orientation by correcting an output of the geomagnetic sensor based on the magnetic field obtained by the obtaining unit.

2. The photographing device according to claim 1, wherein the obtaining unit obtains the magnetic field based on a function expression which expresses a relation between a shifted position of the lens tube which is obtained in advance and the magnetic field that exerts magnetic influence on the geomagnetic sensor from the lens tube.

3. The photographing device according to claim 1, wherein the obtaining unit obtains the magnetic field by using a table data which expresses a relation between a shifted position of the lens tube which is obtained in advance and the magnetic field that exerts magnetic influence on the geomagnetic sensor from the lens tube.

4. The photographing device according to claim 1, wherein the lens tube is a zoom lens.

5. The photographing device according to claim 1, further comprising:
 a control unit which generates image data of a photographed image by receiving an output of the image pickup unit and stores the image data by making orientation data which is calculated by the orientation calculation unit associate with the image data, wherein the orientation calculation unit calculates an orientation of a photographing direction based on the output of the geomagnetic sensor which is obtained at a time of photographing.

6. The photographing device according to claim 1, further comprising:
 an electronic drive unit which generates a magnetic field by being electrically driven, wherein the orientation calculation unit calculates the orientation based on the output of the geomagnetic sensor when the electronic drive unit is not being driven.

7. An orientation measuring method for a photographing device comprising a geomagnetic sensor which detects an intensity of geomagnetism, an image capture unit which captures an image, and a lens tube including a part that exerts magnetic influence on the geomagnetic sensor, wherein a position of the part is shiftable, the method comprising:
 detecting a current shifted position of the part in the lens tube;
 obtaining magnetic field that exerts magnetic influence on the geomagnetic sensor from the lens tube corresponding to the detected current shifted position; and
 calculating an orientation by correcting an output of the geomagnetic sensor based on the obtained magnetic field.

* * * * *